(12) United States Patent
Sendijarevic

(10) Patent No.: US 11,655,328 B2
(45) Date of Patent: May 23, 2023

(54) DIMENSIONALLY STABLE CLOSED-CELL AND RIGID FOAMS PRODUCED WITH METHYLAL BLOWING AGENT

(71) Applicants: Ventrex Systems, LLC, Madison Heights, MI (US); Lambiotte et Compagnie S.A., Brussels (BE); Maroon Group, LLC, Avon, OH (US)

(72) Inventor: Ibrahim Sendijarevic, Bloomfield Hills, MI (US)

(73) Assignee: Ventrex Systems, LLC, Madison Heights, MI (US)

(*) Notice: Subject to any disclaimer, the term of this patent is extended or adjusted under 35 U.S.C. 154(b) by 141 days.

(21) Appl. No.: 17/010,036

(22) Filed: Sep. 2, 2020

(65) Prior Publication Data

US 2022/0064358 A1 Mar. 3, 2022

(51) Int. Cl.
*C08G 18/32* (2006.01)
*C08G 18/08* (2006.01)
*C08J 9/14* (2006.01)

(52) U.S. Cl.
CPC ......... *C08G 18/3215* (2013.01); *C08G 18/14* (2013.01); *C08J 9/142* (2013.01); *C08G 2110/0025* (2021.01); *C08J 2203/12* (2013.01); *C08J 2205/052* (2013.01); *C08J 2205/10* (2013.01)

(58) Field of Classification Search
CPC . C08J 9/0038; C08J 9/142; C08J 9/144; C08J 9/149; C08J 2203/142; C08J 2203/182; C08J 2205/052; C08J 2205/10; C08J 2375/04; C08K 3/016; C08G 18/14; C08G 18/2027; C08G 18/225; C08G 18/3215; C08G 18/4018; C08G 18/4208; C08G 18/4615; C08G 18/4816; C08G 18/4829; C08G 18/7664; C08G 2110/0025; C08G 2110/005
See application file for complete search history.

(56) References Cited

U.S. PATENT DOCUMENTS

| | | |
|---|---|---|
| 5,631,305 A | 5/1997 | Werner et al. |
| 5,723,509 A | 3/1998 | Werner et al. |
| 6,087,410 A | 7/2000 | Falke et al. |
| 6,316,514 B1 | 11/2001 | Falke et al. |
| 7,326,362 B2 | 2/2008 | Hibino et al. |
| 7,438,825 B1 | 10/2008 | Chen et al. |
| 9,000,061 B2 | 4/2015 | Ling et al. |
| 9,238,721 B2 | 1/2016 | Singh et al. |
| 9,522,973 B2 | 12/2016 | Combs et al. |
| 9,527,976 B2 | 12/2016 | Singh et al. |
| 9,556,303 B2 | 1/2017 | Ross et al. |
| 9,695,267 B2 | 7/2017 | Williams et al. |
| 10,077,330 B2 | 9/2018 | Van Der Puy et al. |
| 2014/0171527 A1 | 6/2014 | Yu et al. |
| 2014/0357747 A1 | 12/2014 | Loh et al. |
| 2014/0378559 A1 | 12/2014 | Liu et al. |
| 2015/0218302 A1* | 8/2015 | Brady, III ............... C08J 9/141 521/172 |
| 2015/0344660 A1 | 12/2015 | Williams et al. |
| 2017/0096539 A1* | 4/2017 | Albers ............ C08G 18/7664 |
| 2018/0022884 A1 | 1/2018 | Bogdan et al. |
| 2019/0070447 A1 | 3/2019 | Robin |
| 2019/0085145 A1 | 3/2019 | Yu et al. |
| 2019/0256679 A1 | 8/2019 | Wysong et al. |
| 2020/0017740 A1 | 1/2020 | Hulse et al. |
| 2020/0062918 A1* | 2/2020 | Combs .................. C08J 9/141 |
| 2020/0231735 A1* | 7/2020 | Salsman ............. C08G 63/672 |

* cited by examiner

*Primary Examiner* — John M Cooney
(74) *Attorney, Agent, or Firm* — Brooks Kushman P.C.

(57) ABSTRACT

A method of producing a closed-cell and rigid foam. The method comprises reacting an isocyanate composition including one or more polyisocyanates and a polyol composition including one or more polyols including one or more aromatic polyester polyols having a hydroxyl functionality of greater than 2 and one or more physical and/or chemical blowing agents including methylal to form a closed-cell and rigid foam configured to retain at least 85% of an initial volume of the closed-cell and rigid foam when exposed to about 97% relative humidity at about 70° C. for at least seven or more days.

18 Claims, No Drawings

DIMENSIONALLY STABLE CLOSED-CELL AND RIGID FOAMS PRODUCED WITH METHYLAL BLOWING AGENT

TECHNICAL FIELD

The present disclosure relates to dimensionally stable closed-cell and rigid foams produced with methylal blowing agents. The closed-cell and rigid foams may be used for thermal insulation applications such as without limitation thermal insulation for buildings, appliances, piping, vehicles, and cold packs for perishable item transport and storage.

BACKGROUND

Closed-cell and rigid polyurethane (PUR) foams and polyurethane-modified isocyanurate (PIR) foams may be useful for thermal insulating applications because of their relatively low thermal conductivity and good dimensional stability at relatively low densities. Closed-cell and rigid PUR and PIR foams are conventionally prepared by reacting suitable isocyanates with active hydrogen-containing polyols in the presence of suitable blowing agents, surfactants, catalysts and/or other additives. Broad categories of blowing agents include reactive blowing agents and physical blowing agents. An example of a reactive blowing agent is water. When water reacts with an isocyanate, carbon dioxide and urea linkages are formed. The carbon dioxide can diffuse out of the closed cells of closed-cell and rigid PUR and PIR foams. In some instances, this diffusion can lead to cell collapse, which can result in shrinkage of the foam. Physical blowing agents produce their blowing effect by physical expansion rather than by chemical reaction. Compared to carbon dioxide produced through a reactive blowing agent, physical blowing agents typically more effectively remain trapped in the closed cells of closed-cell PUR and PIR foams, resulting in improved dimensional stability of the foams, while often providing reduced thermal conductivity and therefore improved thermal insulation. Therefore, in addition to water, physical blowing agents are also typically used in production of closed-cell and rigid PUR and PIR foams for insulation applications.

SUMMARY

According to one embodiment, a method of producing a closed-cell and rigid foam is disclosed. The method comprises reacting an isocyanate composition including one or more polyisocyanates and a polyol composition including one or more polyols including one or more aromatic polyester polyols having a hydroxyl functionality of greater than 2 and one or more physical and/or chemical blowing agents including methylal to form a closed-cell and rigid foam configured to retain at least 85% of an initial volume of the closed-cell and rigid foam when exposed to about 97% relative humidity at about 70° C. for at least seven or more days. The polyol composition may further include one or more surfactants and one or more catalysts. The one or more physical and/or chemical blowing agents may additionally include water. The thermal resistivity of the closed-cell and rigid foam is at least an R-value of 6 ft$^2$·h·° F./BTU.

In one or more embodiments, the hydroxyl functionality of each of the one or more aromatic polyester polyols is about 2.2 or greater. In other embodiments, the hydroxyl functionality of each of the one or more aromatic polyester polyols is about 2.5 or greater. In yet other embodiments, the hydroxyl functionality of each of the one or more aromatic polyester polyols is about 3.0 or greater.

The above-identified one or more polyols may additionally include one or more polyether polyols and/or one or more Mannich-based polyols. The polyol composition may include one or more flame-retardant additives.

The closed-cell and rigid foam may be a closed-cell and rigid polyurethane foam or a closed-cell and rigid polyurethane-modified isocyanurate foam.

The initial volume of the closed-cell and rigid foam may have a closed cell content of greater than 80%. The initial volume of the closed-cell and rigid foam may have a closed cell content of greater than 90%.

The one or more physical and/or chemical blowing agents may include solely methylal. In another embodiment, the one or more physical and/or chemical blowing agents may include one or more additional physical and/or chemical blowing agents in addition to the methylal. The one or more additional physical and/or chemical blowing agents may include carbon dioxide ($CO_2$), formic acid, organic acids that in reaction with isocyanate produce $CO_2$ and/or CO, hydrocarbons, ethers, halogenated ethers, esters, alcohols, aldehydes, ketones, pentafluorobutane, pentafluoro propane, hexafluoropropane, heptafluoropropane, trans-1,2 dichloroethylene, methyl formate, 2,2-dichloro-1,1,1-trifluoroethane (HCFC-123), 1-chloro-1,2,2,2-tetrafluoroethane (HCFC-124), 1,1-dichloro-1-fluoroethane (HCFC-141b), 1,1,1,2-tetrafluoroethane (HFC 134a), 1-chloro 1,1-difluoroethane (HCFC-142b), 1,1,1,3,3-pentafluorobutane (HFC-365mfc), trichlorofluoromethane (CFC-11), dichlorodifluoromethane (CFC-12), dichlorofluoromethane (HCFC-22), 1,1,1,3,3,3-hexafluoropropane (HFC-236fa), 1,1,1,2,3,3-hexafluoropropane (HFC-236ea), 1,1,1,2,3,3,3-heptafluoro propane (HFC-227ea), difluoromethane (HFC-32), 1,1-difluoroethane (HFC-152a), 1,1,1,3,3-pentafluoropropane (HFC-245fa), trans-1,3,3,3-tetrafluoropropene (HFO-1234ze(E)), trans-1-chloro-3,3,3-trifluoropropene (HFO-1233zd(E)), 1,1,1,4,4,4-Hexafluoro-2-butene (HFO-1336mzz-Z), butane, isobutane, normal pentane, isopentane, cyclopentane, and combinations thereof. The methylal may represent 5 to 100 weight % of the total weight of the one or more physical and/or chemical blowing agents. The one or more additional physical and/or chemical blowing agents may have an ozone depletion potential (ODP) of about 0 and a global warming potential (GWP) in the range of about 0 to 10.

In another embodiment, a polyol composition is disclosed. The polyol composition includes one or more polyols including one or more aromatic polyester polyols having a hydroxyl functionality of greater than 2, and one or more physical and/or chemical blowing agents including methylal. The polyol composition is reactive with an isocyanate composition to produce a closed-cell and rigid foam configured to retain at least about 85% of its initial volume when exposed to about 97% relative humidity at about 70° C. for at least seven or more days.

In yet another embodiment, a closed-cell and rigid foam is disclosed. The closed-cell and rigid foam is configured to retain at least 85% of an initial volume of the closed-cell and rigid foam when exposed to about 97% relative humidity at about 70° C. for at least seven or more days. The closed-cell and rigid foam is produced by the step of reacting an isocyanate composition including one or more polyisocyanates and a polyol composition including one or more polyols including one or more aromatic polyester polyols having a hydroxyl functionality of greater than 2 and one or more physical and/or chemical blowing agents including methylal.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. These terms may be used to modify any numeric value disclosed or claimed herein. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1 to 10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Closed-cell and rigid polyurethane (PUR) foams and polyurethane-modified isocyanurate (PIR) foams may be useful for thermal insulating applications because of their relatively low thermal conductivity and good dimensional stability at relatively low densities. Closed-cell and rigid PUR and PIR foams are conventionally prepared by reacting suitable isocyanates with active hydrogen-containing polyols in the presence of suitable blowing agents, surfactants, catalysts and/or other additives. Broad categories of blowing agents include reactive blowing agents and physical blowing agents. An example of a reactive blowing agent is water. When water reacts with an isocyanate, carbon dioxide and urea linkages are formed. The carbon dioxide can diffuse out of the closed cells of closed-cell and rigid PUR and PIR foams. In some instances, this diffusion can lead to cell collapse, which can result in shrinkage of the foam. Physical blowing agents produce their blowing effect by physical expansion rather than by chemical reaction. Compared to carbon dioxide produced through a reactive blowing agent, physical blowing agents typically more effectively remain trapped in the closed cells of closed-cell and rigid PUR and PIR foams, resulting in improved dimensional stability of the foams, while often providing reduced thermal conductivity and therefore improved thermal insulation. Therefore, in addition to water, physical blowing agents are also typically utilized in production of closed-cell and rigid PUR and PIR foams for insulation applications.

Liquid chlorofluorocarbons (CFCs) and hydro chlorofluorocarbons (HCFCs) have been used as physical blowing agents to produce closed-cell and rigid PUR and PIR foams with good thermal insulation and dimensional stability properties. However, CFCs and HCFCs have relatively high ozone depletion potential (ODP) and global warming potential (GWP). As an example of a CFC, CFC-11 has an ODP of about 1 and a GWP of about 4,750. CFCs were replaced with reduced ODP blowing agents such as HCFC 141b. HCFC 141b has an ODP of about 0.12 and a GWP of about 725. Saturated hydrofluorocarbons (HFCs) with relatively low ODP have replaced CFCs and HCFC in many applications. For instance, HFC 245fa has an ODP of about 0 and a GWP of about 1030. HCFs have relatively high GWPs. As a result, the use of HCFs are also being phased out and replaced with blowing agents characterized with both low ODP and low GWP.

Several blowing agents for use in closed-cell and rigid PUR and PIR foams have relatively low ODP and relatively low GWP. The blowing agents with relatively low ODP and relatively low GWP approved for use in closed-cell and rigid PUR and PIR foams in the United States are listed by Environmental Protection Agencies (EPA) as part of the Significant New Alternative Policy (SNAP) program. Among these blowing agents are hydrocarbons and hydrofluoroolefins (HFO). HFOs of interest include trans-1,3,3,3-tetrafluoropropene (1234ze(E)) available under the tradename Solstice GBA, 1,1,1,4,4,4 hexafluorobut-2-ene (1336mzz-Z) available under tradename Opteon 1100, and trans-1-chloro-3,3,3-trifluoropropene (1233zd(E)) available under the tradename Solstice LBA. HFO-1233zd(E) has an ODP of about 0 and a GWP of about 4.7 to 7. HFO-1336mzz-Z has an ODP of about 0 and a GWP of about 9. HFOs generally produce closed-cell and rigid PUR and PIR foams with good dimensional stability and relatively low thermal conductivity. Therefore, HFOs are generally suitable for use in closed-cell and rigid PUR and PIR foams for thermal insulation applications. However, one major drawback for HFOs is their relatively high cost.

Hydrocarbon blowing agents, such as, iso-pentane, n-pentane and cyclopentane, are typically less expensive than HFOs. However, hydrocarbon blowing agents are often flammable, thereby requiring special provisions for safe handling in production of foams. Also, certain hydrocarbons, such as n-pentane, have poor compatibility with polyols, which can create stability issues in applications where a two-component reactive system are used. In two component systems, component A typically contains isocyanate while component B is a polyol or blend of polyols, blowing agents, catalyst, surfactants, and potentially other additives based on the application. Accordingly, closed-cell and rigid PUR and PIR foams are readily prepared by bringing together the A and B components either by hand mixing for small preparations or machine mixing techniques for larger preparations to form blocks, slabs, laminates, pour-in-place panels, spray applied foams, froths, and other forms. In these applications, component B shelf life stability is a consideration in achieving closed-cell and rigid PUR and PIR foams with specified properties.

Methylal (otherwise referred to as dimethoxymethane) is also emerging as a viable option for use as a physical blowing agent in closed-cell and rigid PUR and PIR foams. Methylal has a relatively low ODP (about 0) and a relatively low GWP (less than about 3). Methylal has a boiling temperature of 42.3° C., which is in the range of some of the existing blowing agents used in closed-cell and rigid PUR and PIR foams. Methylal is also compatible with most polyols and other compounds typically present in component B polyol blends used in two component systems to produce closed-cell and rigid PUR and PIR foams. Methylal also has good compatibility with other physical blowing agents, including HFOs, and hydrocarbons. Therefore, methylal can be used as a sole physical blowing agent or in combination with other physical and chemical blowing agents. The methylal may represent 5 to 100 weight % of the total weight of the one or more physical and/or chemical blowing agents.

However, one of the challenges encountered with the use of Methylal in closed-cell and rigid PUR and PIR foams is reduction in dimensional stability of the foams, especially when exposed to humid air at 97±3% relative humidity at 70° C. conditions per ASTM D2126. In most insulation applications, it is desirable for the closed-cell and rigid PUR and PIR foams to experience relatively low levels of dimensional change during the humid age conditions of 97±3% at 70° C. per ASTM D2126, and in many instances less than 15% volume change is beneficial after 1 to 2 weeks of exposure. Therefore, there is a need for a reactive composition that includes methylal as a physical blowing agent that produces closed-cell and PUR and/or PIR foams for thermal insulation applications with good dimensional stability.

It was experimentally determined that the humid age dimensional stability of closed-cell and rigid PUR foam is reduced when methylal is used as a physical blowing agent. In one or more embodiments, high functionality polyester polyols are added to a reactive composition to improve the humid age dimensional stability of the resulting closed-cell and rigid PUR foam. Conventionally, polyether polyols with hydroxyl functionality of about 4.5 or higher may been thought to improve the dimensional stability of closed-cell and rigid foams. However, according to the experimentation conducted and disclosed herein, using a polyether polyol of functionality of 4.5 with a methylal blowing agent resulted in closed-cell rigid PUR foams with unacceptable humid age dimensional stability. Increasing the hydroxyl functionality of polyether polyols to 5 does not significantly improve the dimensional stability of closed-cell PUR foams containing a methylal blowing agent.

Unexpectedly, it was discovered that increasing the hydroxyl functionality of aromatic polyester polyols from about 2 to about 2.2 significantly improves the dimensional stability of closed-cell and rigid PUR foams containing methylal as a blowing agent. It was further discovered that increasing the hydroxyl functionality of aromatic polyester polyols from about 2 to about 3 further improves the dimensional stability of closed-cell and rigid PUR foams containing methylal as the blowing agent. It was also discovered that the dimensional stability of closed-cell and rigid PUR foams improves by the addition of aromatic polyester polyol with hydroxyl functionality greater than 2 in cases where methylal is used as the sole physical blowing agent or when methylal is used in combination with one or more other blowing agents.

According to one embodiment, a reaction system includes an isocyanate composition including one or more isocyanates and a polyol composition. The polyol composition may include one or more polyols, methylal, one or more surfactants, and one or more catalysts. In one or more of embodiments, the one or more polyols includes an aromatic polyester polyol with a hydroxyl functionality of greater than 2. The isocyanate composition and the polyol composition of the reaction system are reacted to form a closed-cell and rigid PUR or PIR foam having dimensional stability that is characterized by less than or equal to a 15% volume reduction when exposed to humidity-aged conditions of about 97%±3% relative humidity at about 70° C. for at least 1 week per ASTM D2126. The resulting closed-cell and rigid PUR and PIR foams may have at least 80% closed cell content, and in some embodiments, at least 90% closed cell content. The closed cell content of closed-cell foams may be determined via the pycnometer method per ASTM D-6226. Alternatively, the pycnometer method may be performed using ASTM D2856. Such closed-cell and rigid foams may be used as thermal insulation for buildings, appliances, piping, vehicles, cold packs for perishable item transport and storage, among other applications.

An isocyanate composition of a reaction system of one or more embodiments may include one or more organic isocyanates. For example, useful organic isocyanates include those having a functionality greater than or equal to 2, such as diphenylmethane diisocyanate (MDI). Furthermore, it is desirable for MDI to have functionality greater than 2, and, in some embodiments, functionality of 2.7 or greater. In some embodiments, the isocyanate side includes polymeric MDI, wherein polymeric MDI includes 2 functional 4,4'-MDI, 2,4'-MDI, and 2,2'-MDI isomers and higher-functionality MDI oligomers. Furthermore, the aromatic polyisocyanate may contain, without limitation, from 5% to 50%, 20% to 34%, or 25 to 33.8% by weight of free isocyanate (NCO) groups. Non-limiting examples of suitable commercially available polymeric MDI isocyanates include those sold as Rubinate M from Huntsman Corp. of The Woodlands, Tex., Rubinate 9257 from Huntsman Corp. of The Woodlands, Tex., Lupranate M20 from BASF SE of Germany, Lupranate M70L from BASF SE of Germany, and Papi 27 from Dow Chemical Co. of Midland, Mich.

Non-limiting examples of isocyanates that can be used in a reaction system of one or more embodiments may also include toluene diisocyanate (e.g. 2,4- or 2,6-isomers and mixtures thereof), 1,5 naphthalene diisocyanate, 1,4-diisocyanatobenzene, aliphatic diisocyanates (e.g. isophorone diisocyanate, 1,6-diisocyanatohexane, 1,5-pentamethylene diisocyanate, and 4,4-diisocyanato-dicyclohexylmethane), and polyisocyanates modified with various groups including, without limitation, ester groups, urea groups, biuret groups, allophanate groups, carbodiimide groups, isocyanurate groups, uretdione groups, and urethane groups.

The one or more polyols of a reaction system of one or more embodiments may contain one or more aromatic polyester polyols with hydroxyl functionality greater than 2. In one or more embodiments, hydroxyl functionality refers to the theoretical average number of isocyanate-reactive hydroxyl groups per one polyol molecule. Aromatic polyester polyol with a hydroxyl functionality greater than 2 may constitute 100% by weight of the one or more polyols, at least about 60% by weight of polyol composition of the one or more polyols, or at least 30% by weight of the one or more polyols.

In certain embodiments, the one or more aromatic polyester polyols have a hydroxyl functionality of about 2.2 or greater, about 2.5 or greater, or about 3.0 or greater. Non-limiting examples of suitable aromatic polyester polyols with hydroxyl functionality greater than 2 includes polyols produced via condensation reaction of terephthalic acid with reagents having average hydroxyl functionality greater than 2. Non-limiting examples of suitable aromatic polyester polyols with hydroxyl functionality greater than 2 also include those produced via reaction of phthalic anhydride with reagents having average hydroxyl functionality greater than 2. Additionally, suitable aromatic polyester polyols with hydroxyl functionality greater than 2 may include those produced via chemical depolymerization of polyethylene terephthalate (PET) with reagents having average hydroxyl functionality greater than 2. Without limitation, examples of reagents having average hydroxyl functionality greater than 2 includes glycerol, castor oil, triethanolamine, pentaerythritol, and combinations therefore, which may be further blended with one or more other glycols. Non-limiting examples of aromatic polyester polyols with hydroxyl functionality greater than 2 include Stepanpol PS-3422 from Stepan Company of Northfield, Ill., TERATE® HT 5349 from Invista of Wichita, Kans., Terol 649 from Huntsman Corp. of The Woodlands, Tex., and EMEROX 14700 Polyols Series from Emery Oleochemicals Sdn Bhd of Malaysia.

The one or more polyols of a reaction system may also include aromatic polyester polyols with hydroxyl functionality of 2, including those produced via condensation reaction of terephthalic acid with one or more glycols or via reaction of one or more glycols and phthalic anhydride. Additionally, suitable 2-functional aromatic polyester polyols may include those produced via chemical depolymerization of PET. Examples of suitable aromatic polyester polyols with hydroxyl functionality of 2 includes, without limitation, Terol 250 from Huntsman Corp. of The Woodlands, Tex. and Stepanpol PS-2352 from Stepan Company of Northfield, Ill.

The one or more polyols of a reaction system of one or more embodiments may include one or more polyether polyols made by alkoxylating initiators containing from 2 to 8 active hydrogen atoms per molecule. The one or more initiators may include without limitation one or more glycols, glycerol, trimethylolpropane, triethanolamine, pentaerythritol, Sorbitol, Sucrose, ethylenediamine, ethanolamine, diethanolamine and combinations thereof. One or more alkylene oxides may include ethylene oxide, propylene oxide and a combination thereof. Examples of suitable polyether polyols includes, without limitation, Jeffol SG-360 and Jeffol S-490 from Huntsman Corp. of The Woodlands, Tex.

The one or more polyols of a reaction system of one or more embodiments may also include Mannich polyols, including those Mannich polyols having a nominal hydroxyl functionality of at least 2. Suitable Mannich polyols include, without limitation, those produced via the condensation reaction of either or both of phenol and an alkylphenol with formaldehyde and one or more of monoethanolamine, diethanolamine, and diisopropanolamine. Suitable Mannich polyols include, without limitation, those produced via condensation reaction of phenol or nonylphenol with formaldehyde and diethanolamine. Other suitable polyols include produced via alkoxylation of the Mannich condensates with ethylene oxide, propylene oxide, and a combination thereof. Non-limiting examples of suitable Mannich based polyols includes, without limitation, Jeffol R-425X and Jeffol R-470X from Huntsman Corp. of The Woodlands, Tex.

The one or more polyols of a reaction system may also include one or more polyols based on phenol, a phenol formaldehyde containing polyol, sorbitol containing polyols, glycerol, ethylene glycol, diethylene glycol, propylene glycol, graft copolymers of polyether polyols with a vinyl polymer, copolymer of a polyether polyol with a polyurea, diethanolamine, castor oil, polyols based on natural oil, aliphatic polyester polyols, cashew oil based polyols, lignin based polyols and any combination thereof.

The polyol composition of a reaction system of one or more embodiments may include one or more surfactants. In certain embodiments, the polyol composition includes one or more silicone-containing surfactant. A silicone-containing surfactant may be used to aid in the formation of cells from the reactive mixture of the reaction system and/or to control the cell size and structure. In closed-cell and rigid PUR and PIR foam for use in thermal insulation, it is typically desirable to form cells with uniform, small, and substantially closed cells structure to obtain foams with relatively high thermal resistivity and relatively high compressive strength. Thermal resistivity may be reported as an R-Value with units $ft^2h^\circ$ F./BTU. The R-Value may be measured via ASTM C518. In one or more embodiments, the closed-cell and rigid PUR foams have an R-Value of at least 6 $ft^2h^\circ$ F./BTU and, in other embodiments, have an R-Value of at least 7 $ft^2h^\circ$ F./BTU. Compressive strength for spray closed-cell and rigid foam (e.g. PUR foam) is typically measured with ASTM D1621. Compressive strength is measured parallel to foam rise. Typical spray foam with nominal density of about 2 pounds per cubic foot (pcf), typically needs to have compression strength of at least 25 psi. Higher density spray foams used in roofing applications can have higher density, typically in the range of 2.5 to 3 pcf require compression strength of at least 40 psi. Closed-cell and rigid spray foam with nominal density of about 2 pcf typically have aged R-value of greater than 6. In some embodiments, the R-value is greater than 6, in other embodiments, greater than 6.5, and in yet other embodiments, greater than 7.

The silicone-containing surfactant may aid in producing a foam with stable cells that do not collapse during foam rise. Silicone-containing surfactants for use in the preparation of closed-cell and rigid PUR or PIR foams are available under a number of trade names. Examples of suitable silicon-containing surfactants include without limitation Niax L-6972, L-6620, L-5420, L-5440, L-6100, L-6900, L-6980 and L-6988 available from Momentive Performance Materials Company of Waterford, N.Y., Vorasurf DC-193, DC-197, DC-5103, and DC-5357 available from Dow Chemical Co. of Midland, Mich., and Tegostab B-8404, B-8407, B-8409 and B-8462 available from Evonik Industries AG of Germany. The silicone-containing surfactant may be pre-blended with the polyol composition in an amount from about 0.5 wt. % to about 5.0 wt. %, in other embodiments, from about 1.0 wt. % to about 4.0 wt. %, and yet other embodiments from about 1.5 wt. % to about 3.0 wt. %, by weight of the pre-mix polyol composition.

The polyol composition of a reaction system of one or more embodiments may include methylal as a physical blowing agent. In certain embodiments, it is desirable to use methylal containing a relatively low level of methanol impurity, as methanol can lead to undesirable polymer chain-terminating reactions with isocyanates. In one or more embodiments, the methanol impurity level is less than 5 wt. %, and in other embodiments, less than 1 wt. %, and in yet other embodiments less than 0.5 wt. %. Without limitation, methylal is available from Lambiotte & Cie of Belgium, which produces methylal with relatively low levels of methanol.

The polyol composition of a reaction system of one or more embodiments may include one or more catalysts. The one or more catalysts may include one or more amine catalysts, such as, but not limited to, primary amine, secondary amine or tertiary amine catalysts that promote one or more reactions between one or more isocyanates and one or more polyols, a trimerization reaction of one or more isocyanates, and/or one or more reactions of one or more isocyanates with water to generate $CO_2$. The one or more catalysts may further include one or more metal catalysts, including metal salts, metal carboxylic acid salts, organometallic catalysts, which typically promote one or more reactions between one or more polyols and one or more isocyanates and a trimerization reaction of one or more isocyanates leading to isocyanurate ring formation.

In certain embodiments, one or more catalysts may be used based on their stability when in contact with one or more HFO blowing agents. Suitable catalysts may include without limitation tertiary amine catalysts (e.g. dimethylcyclohexylamine, benzyldimethylamine, N,N,N',N',N'-pentamethyldiethylenetriamine, 2,4,6-tris-(dimethylaminomethyl)-phenol, triethylenediamine, N,N-dimethyl ethanolamine, and combinations thereof), organometallic compounds (e.g. potassium octoate (2-ethylhexanoate), potassium acetate, dibutyltin dilaurate, dibutlytin diacetate, and combinations thereof), and quaternary ammonium salts (e.g. 2-hydroxypropyl trimethylammonium formate, N-substituted triazines (e.g. N,N',N'-dimethylaminopropylhexahydrotriazine), and combinations thereof). Examples of suitable catalyst includes without limitation Dabco 33LV, Dabco 2040, Dabco DMDEE, Polycat 8, and Polycat 5 available from Evonik Industries AG of Germany, PEL-CAT 9540-A available from Ele Corporation of McCook, Ill.; and Bicat 8842 available from Everchem Specialty Chemicals of Media, Pa.

The polyol composition of a reaction system of one or more embodiments may include one or more flame-retardant additives compatible with PUR and PIR foams. Non-limiting examples include organo-phosphorous compounds (e.g. organic phosphates, phosphites, phosphonates, polyphosphates, polyphosphites, polyphosphonates, ammonium polyphosphates, triethyl phosphate, diethy ethyl phosphonate, and tris(1-chloro-2-propyl)-phosphate); and halogenated fire retardants (e.g. tetrabromophthalate esters and chlorinated parrafins); and combinations thereof.

The polyol composition of a reaction system of one or more embodiments may include one or more physical and/or chemical blowing agents in addition to methylal. The one or more physical and/or chemical blowing agents may include carbon dioxide ($CO_2$), formic acid, organic acids that form $CO_2$ and/or CO when reacting with one or more isocyanates, hydrocarbons, ethers, halogenated ethers, esters, alcohols, aldehydes, ketones, pentafluorobutane, pentafluoro propane, hexafluoropropane, heptafluoropropane, trans-1,2 dichloroethylene, methyl formate, 2,2-dichloro-1,1,1-trifluoroethane (HCFC-123), 1-chloro-1,2,2,2-tetrafluoroethane (HCFC-124), 1,1-dichloro-1-fluoroethane (HCFC-141b), 1,1,1,2-tetrafluoroethane (HFC 134a), 1-chloro 1,1-difluoroethane (HCFC-142b), 1,1,1,3,3-pentafluorobutane (HFC-365mfc), trichlorofluoromethane (CFC-11), dichlorodifluoromethane (CFC-12), dichlorofluoromethane (HCFC-22), 1,1,1,3,3,3-hexafluoropropane (HFC-236fa), 1,1,1,2,3,3-hexafluoropropane (HFC-236ea), 1,1,1,2,3,3,3-heptafluoro propane (HFC-227ea), difluoromethane (HFC-32), 1,1-difluoroethane (HFC-152a), 1,1,1,3,3-pentafluoropropane (HFC-245fa), trans-1,3,3,3-tetrafluoropropene (HFO-1234ze(E)), trans-1-chloro-3,3,3-trifluoropropene (HFO-1233zd(E)), 1,1,1,4,4,4-Hexafluoro-2-butene (HFO-1336mzz-Z), butane, isobutane, normal pentane, isopentane, cyclopentane, and combinations thereof. In one or more embodiments, the one or more physical and/or chemical blowing agents may have a relatively low ODP and a relatively low GWP. In one or more embodiments, the ODP may be about 0. In one or more embodiments, the GWP may be in the range of about 0 to about 10.

According to one or more embodiments, a closed-cell and rigid PUR or PIR foam may be made using a two component system, where component A contains one or more isocyanates while component B is a blend of one or more aromatic polyester polyols with hydroxyl functionality greater than 2, methylal, and one or more surfactants. Component B can also include one or more additional additives, such as one or more additional surfactants, one or more additional polyols, one or more additional physical and/or reactive blowing agents, catalysts, one or more flame retardants, and one or more other additives. Accordingly, closed-cell and rigid PUR or PIR foams are prepared by bringing together components A and B by hand mixing for small preparations or machine mixing techniques for larger preparations to form blocks, slabs, laminates, pour-in-place panels, spray applied foams, froths, and other forms. In these applications, component B shelf stability is a desirable characteristic for producing the closed-cell and rigid PUR or PIR foam.

The various aspects of the invention are illustrated, but not limited, by the following examples. Table 1 identifies a list of materials used in the examples. Unless otherwise noted, the materials are used in raw form as received and without modification.

TABLE 1

| Designation | Trade Name | Description |
| --- | --- | --- |
| Polyol A1 | Terol 250 | Aromatic polyester polyol<br>Hydroxyl value = 250 mg KOH/g<br>Functionality of 2 |
| Polyol A2 | Stepanpol PS 3422 | Aromatic polyester polyol<br>Hydroxyl value = 340 to 360 mg KOH/g<br>Functionality of 2.2 |
| Polyol A3 | Terol 649 | Modified aromatic polyester polyol<br>Hydroxyl value = 368.3 mg KOH/g<br>Functionality of 3 |
| Polyol B | Jeffol R-470X | Nonyl-phenol initiated mannich polyol<br>Hydroxyl value = 474 mg KOH/g<br>Functionality 3.3 |
| Polyol C1 | Markol RB 360 | Sucrose-glycerol based polyether polyol<br>Hydroxyl value = 360 mg KOH/g<br>Functionality of 4.5 |
| Polyol C2 | Jeffol SG 522 | Sucrose-glycerol based polyether polyol<br>Hydroxyl Value = 520 mg KOH/g<br>Functionality of 5.0 |
| Surfactant | DabcoDC 193 | Silicone surfactant |
| Flame Retardant | TCPP | Tris(2-chloroisopropyl)phosphate |
| Catalyst 1 | Toyocat DM 70 | Gelling catalyst for rigid foams |
| Catalyst 2 | PEL-CAT 9540-A | 2-Ethylhexoic Acid, Potassium salt in DEG |
| Isocyanate 1 | Rubinate M | Polymeric MDI<br>2.7 functionality<br>NCO = 29.8% |
| Isocyanate 2 | Lupranate M20S | Polymeric MDI<br>2.7 functionality<br>NCO % = 31.96% |
| Water | Water | Distilled Water |
| Methylal | Methylal | Pure Grade from Lambiotte |
| HFO 1 | Opteon 1100 | Z-1,1,1,4,4,4-Hexafluoro-2-butene<br>HFO-1336mzz-Z |
| HFO 2 | Solstice LBA | 1-Chloro-3,3,3-trifluoropropene<br>HFO-1233zd(E) |

The following examples are based on PUR foams produced on a laboratory scale. Mixing on the laboratory scale was completed with a drill mixer equipped with a high shear mix blade. Raw materials in component B were first mixed for 30 seconds. Subsequently, isocyanate was added to component B and mixed for 5 seconds. The mix was subsequently poured into a box and allowed to cure. Properties of the foams were measured after at least 1 week. Dimensional stability of foams was measured by monitoring the volume change after 1 week age at about 70° C. and about 97% RH following ASTM D2126. Order of component mixing is non-limiting, and on foam production scale, pre-blending of components may not be required prior to final mixing.

Examples 1a and 1b

Examples 1a and 1b show compositions and properties of PUR foams produced from aromatic polyester polyol with hydroxyl functionality of 2 (polyol A1) with methylal used in combination with an HFO blowing agent. As shown in Table 2, the resulting foam in Examples 1a and 1b show poor dimensional stability, as indicated by the high changes in volume (negative values indicates shrinkage) during the humid age exposure. Use of the high hydroxyl functionality polyether polyol did not significantly improve the overall dimensional stability of foams. Increasing the functionality of polyether polyol from about 4.5 (Example 1a) to about 5.0 (Example 1b) did not significantly improve the dimensional stability with high level of shrinkage recorded.

TABLE 2

| Designation | Example 1a | Example 1b |
|---|---|---|
| Component B | | |
| Polyol A1 | 60 | |
| Polyol B | 30 | |
| Polyol C1 | 10 | — |
| Polyol C2 | — | 10 |
| Flame retardant | 10 | |
| Surfactant | 1.5 | |
| Catalyst A | 3 | |
| Catalyst B | 1 | |
| Total Water | 2.2 | |
| HFO-2 | 6 | 6 |
| Methylal | 3 | 3 |
| Total Side B, pbw | 126.68 | 126.65 |
| Isocyanate Component A | | |
| Isocyanate 2 | 125.37 | 129.49 |
| Isocyanate Index | 110% | |
| Foam Properties | | |
| Core Density, pcf | 1.96 ± 0.15 | 1.96 ± 0.11 |
| Dimensional Stability, 70° C., 97% RH, 7 days | | |
| Volume Change, % | −25.23 ± 2.17 | −21.32 ± 3.15 |

Examples 2a and 2b

Examples 2a and 2b show compositions and properties of PUR foams produced from aromatic polyester polyol and methylal used in combination with an HFO blowing agent. Unexpectedly, as shown in Table 3, the volume change (shrinkage) of the foams during the humid age significantly decreased with increase in aromatic polyester polyol hydroxyl functionality, indicating an improvement in dimensional stability of the foams. The results of Examples 2a and 2b contrasts with the results in Examples 1a and 1b, where increasing the functionality of polyether polyols yielded no significant change in the dimensional stability.

TABLE 3

| Designation | Example 2a | Example 2b |
|---|---|---|
| Component B | | |
| Polyol A1 | 60 | — |
| Polyol A3 | — | 60 |
| Polyol B | 30 | |
| Polyol C1 | 10 | |
| Flame retardant | 10 | |
| Surfactant | 1.5 | |
| Catalyst A | 3 | |
| Catalyst B | 1 | |
| Total Water | 2.2 | |
| HFO-2 | 6 | 6 |
| Methylal | 3 | 3 |
| Total Side B, pbw | 126.68 | 126.65 |
| Isocyanate Component A | | |
| Isocyanate 2 | 125.37 | 143.66 |
| Isocyanate Index | 110% | |
| Foam Properties | | |
| Core Density, pcf | 1.96 ± 0.15 | 2.29 ± 0.25 |
| Dimensional Stability, 70° C. 97% RH, 7 days | | |
| Volume Change, % | −25.23 ± 2.17 | −7.46 ± 6.00 |

Examples 3a, 3b and 3c

Examples 3a, 3b and 3c show compositions and properties of closed-cell and rigid PUR foams produced from aromatic polyester polyol (Polyol A1) and methylal as the sole physical blowing agent. The resulting foam of Example 3a based on Polyol A1 with hydroxyl functionality of 2 has a relatively low dimensional stability, indicated by high volume change after humid age exposure (negative volume values indicate shrinkage). In Example 3b, replacing Polyol A1 with aromatic polyester polyol with hydroxyl functionality of about 2.2 significantly improved the dimensional stability of the resulting foams as indicated by reduction in the volume change resulting from the humid age exposure. In Example 3c, increasing aromatic polyester polyol functionality to about 3 resulted in additional improvement in dimensional stability of foam. Table 4 shows the experimental results for Examples 3a, 3b and 3c.

TABLE 4

| Sample Designation | Example 3a | Example 3b | Example 3c |
|---|---|---|---|
| Component B | | | |
| Polyol A1 | 60 | 0 | 0 |
| Polyol A2 | 0 | 60 | 0 |
| Polyol A3 | 0 | 0 | 60 |
| Polyol B | | 30 | |
| Polyol C1 | | 10 | |
| Flame retardant | | 10 | |
| Water | | 2.2 | |
| Surfactant | | 1.5 | |
| Catalyst A | | 3.0 | |
| Catalyst B | | 1.0 | |
| Methylal | | 6 | |
| Total Side B, g | | 123.7 | |
| Isocyanate Component A | | | |
| Isocyanate A | 134.71 | 151.62 | 143.65 |
| Isocyanate Index | | 110 | |
| Dimensional Stability, 70° C. 97% RH, 7 days | | | |
| Volume change, % | −26.4 | −15.2 | −5.25 |

Examples 4a to 4f

Examples 4a through 4f show closed-cell and rigid PUR foam produced from aromatic polyester polyol with methylal used in combination with the HFO blowing agent. With each blend of methylal and an HFO, the overall compressive strength and dimensional stability of foams and thermal resistivity improved as the hydroxyl functionality of aromatic polyester polyol increases from about 2 to about 2.2. Table 5 shows the experimental results for Examples 4a through 4f.

TABLE 5

| Designation | Example 4a | Example 4b | Example 4c | Example 4d | Example 4e | Example 4f |
|---|---|---|---|---|---|---|
| Component B | | | | | | |
| Polyol A1 | 60 | — | 60 | — | 60 | — |
| Polyol A2 | — | 60 | — | 60 | — | 60 |
| Polyol B | | | | 30 | | |
| Polyol C1 | | | | 10 | | |
| Flame retardant | | | | 10 | | |
| Water | | | | 2.2 | | |
| Surfactant | | | | 1.5 | | |
| Catalyst A | | | | 3.0 | | |
| Catalyst B | | | | 1.0 | | |
| HFO-1 | — | — | 4 | 4 | 6 | 6 |
| Methylal | 6 | 6 | 4 | 4 | 3 | 3 |
| Total Side B, g | 123.7 | 123.7 | 125.7 | 125.7 | 126.7 | 126.7 |
| Isocyanate Component A | | | | | | |
| Rubinate M (Iso Index) | | | | 110 | | |
| Foam Properties | | | | | | |
| Free-Rise Density, pcf | 2.20 ± 0.18 | 2.50 ± 0.13 | 2.39 ± 0.08 | 2.50 ± 0.15 | 2.27 ± 0.19 | 2.38 ± 0.17 |
| Compressive Strength @ 10% Strain | | | | | | |
| Parallel to foam rise, psi | 29.5 ± 4.0 | 33.2 ± 2.6 | 30.6 ± 3.8 | 41.8 ± 3.9 | 41.9 ± 1.6 | 44.7 ± 3.3 |
| Dimensional Stability, 70°C, 97%RH, 7 days | | | | | | |
| Volume change, % | −26.4 ± 4.0 | −15.2 ± 4.9 | −17.6 ± 2.0 | −6.7 ± 4.2 | −13.5 ± 4.1 | −3.6 ± 2.7 |
| Thermal Resistivity (R-value) | | | | | | |
| 0°-25° C. (12.5° C. mean) | 6.03 ± 0.01 | 6.21 ± 0.03 | 6.24 ± 0.07 | 6.44 ± 0.16 | 6.40 ± 0.10 | 6.44 ± 0.28 |
| 10°-35° C. (22.5° C. mean) | 5.70 ± 0.00 | 5.87 ± 0.03 | 5.91 ± 0.06 | 6.10 ± 0.15 | 6.05 ± 0.10 | 6.11 ± 0.23 |

What is claimed is:

1. A method of producing a closed-cell and rigid foam, the method comprising:
reacting an isocyanate composition including one or more polyisocyanates and a polyol composition including one or more polyols including one or more aromatic polyester polyols having a hydroxyl functionality of greater than 2 and physical blowing agents including methylal representing at least 33 weight % of the total weight of the physical blowing agents and one or more of the following HFO physical blowing agents: trans-1,3,3,3-tetrafluoropropene (HFO-1234ze(E)), trans-1-chloro-3,3,3-trifluoropropene (HFO-1233zd(E)), and 1,1,1,4,4,4-Hexafluoro-2-butene (HFO-1336mzz-Z) to form the closed-cell and rigid foam configured to retain at least 85% of an initial volume of the closed-cell and rigid foam when exposed to about 97% relative humidity at about 70° C. for at least seven or more days.

2. The method of claim 1, wherein the hydroxyl functionality of each of the one or more aromatic polyester polyols is about 2.2 or greater.

3. The method of claim 1, wherein the hydroxyl functionality of each of the one or more aromatic polyester polyols is about 2.5 or greater.

4. The method of claim 1, wherein the hydroxyl functionality of each of the one or more aromatic polyester polyols is about 3.0 or greater.

5. The method of claim 1, wherein the one or more polyols additionally includes one or more polyether polyols and/or one or more Mannich-based polyols.

6. The method of claim 1, wherein the polyol composition includes one or more flame-retardant additives.

7. The method of claim 1, wherein the closed-cell and rigid foam is a closed-cell and rigid polyurethane foam.

8. The method of claim 1, wherein the closed-cell and rigid foam is a closed-cell and rigid polyurethane-modified isocyanurate foam.

9. The method of claim 1, wherein the closed-cell and rigid foam has a closed cell content of greater than 80%.

10. The method of claim 1, wherein the closed-cell and rigid foam has a closed cell content of greater than 90%.

11. The method of claim 1, wherein the blowing agents includes one or more additional physical and/or chemical blowing agents.

12. The method of claim 11, wherein the one or more additional physical and/or chemical blowing agents includes carbon dioxide ($CO_2$), formic acid, organic acids that in reaction with isocyanate produce $CO_2$ and/or CO, water that in reaction with isocyanate produces $CO_2$, hydrocarbons, ethers, halogenated ethers, esters, alcohols, aldehydes, ketones, pentafluorobutane, pentafluoro propane, hexafluoropropane, heptafluoropropane, trans-1,2 dichloroethylene, methyl formate, 2,2-dichloro-1,1,1-trifluoroethane (HCFC-123), 1-chloro-1,2,2,2-tetrafluoroethane (HCFC-124), 1,1-dichloro-1-fluoroethane (HCFC-141b), 1,1,1,2-tetrafluoroethane (HFC 134a), 1-chloro 1,1-difluoroethane (HCFC-142b), 1,1,1,3,3-pentafluorobutane (HFC-365mfc), trichlorofluoromethane (CFC-11), dichlorodifluoromethane (CFC-12), dichlorofluoromethane (HCFC-22), 1,1,1,3,3,3-hexafluoropropane (HFC-236fa), 1,1,1,2,3,3-hexafluoropropane (HFC-236ea), 1,1,1,2,3,3,3-heptafluoro propane (HFC-227ea), difluoromethane (HFC-32), 1,1-difluoroethane (HFC-152a), 1,1,1,3,3-pentafluoropropane (HFC-245fa), butane, isobutane, normal pentane, isopentane, cyclopentane, and combinations thereof.

13. The method of claim 11, wherein the one or more additional physical and/or chemical blowing agent has an ozone depletion potential (ODP) of about 0 and a global warming potential (GWP) in the range of about 0 to 10.

14. The method of claim 1, wherein a thermal resistivity of the closed-cell and rigid foam is at least an R-Value of 6 $ft^2h°$ F./BTU.

15. The method of claim 1, wherein a thermal resistivity of the closed-cell and rigid foam is at least an R-Value of 7 $ft^2h°$ F./BTU.

16. The method of claim 1, wherein the polyol composition further includes one or more surfactants and one or more catalysts.

17. A method of producing a closed-cell and rigid foam, the method comprising:
reacting an isocyanate composition including one or more polyisocyanates and a polyol composition including one or more polyols including one or more aromatic polyester polyols having a hydroxyl functionality of greater than 2 and a physical blowing agent of solely methylal to form the closed-cell and rigid foam configured to retain at least 85% of an initial volume of the closed-cell and rigid foam when exposed to about 97% relative humidity at about 70° C. for at least seven or more days.

18. A method of producing a closed-cell and rigid foam, the method comprising: reacting an isocyanate composition including one or more polyisocyanates and a polyol composition including one or more polyols including one or more aromatic polyester polyols having a hydroxyl functionality of greater than 2 and physical blowing agents including methylal and trans-1-chloro-3,3,3-trifluoropropene (HFO-1233zd(E)) to form the closed-cell and rigid foam configured to retain at least 85% of an initial volume of the closed-cell and rigid foam when exposed to about 97% relative humidity at about 70° C. for at least seven or more days, wherein the methylal is present at levels of 3 to 5 weigh parts based on 100 weight parts of the one or more polyols.

* * * * *